Figures 1, 3:
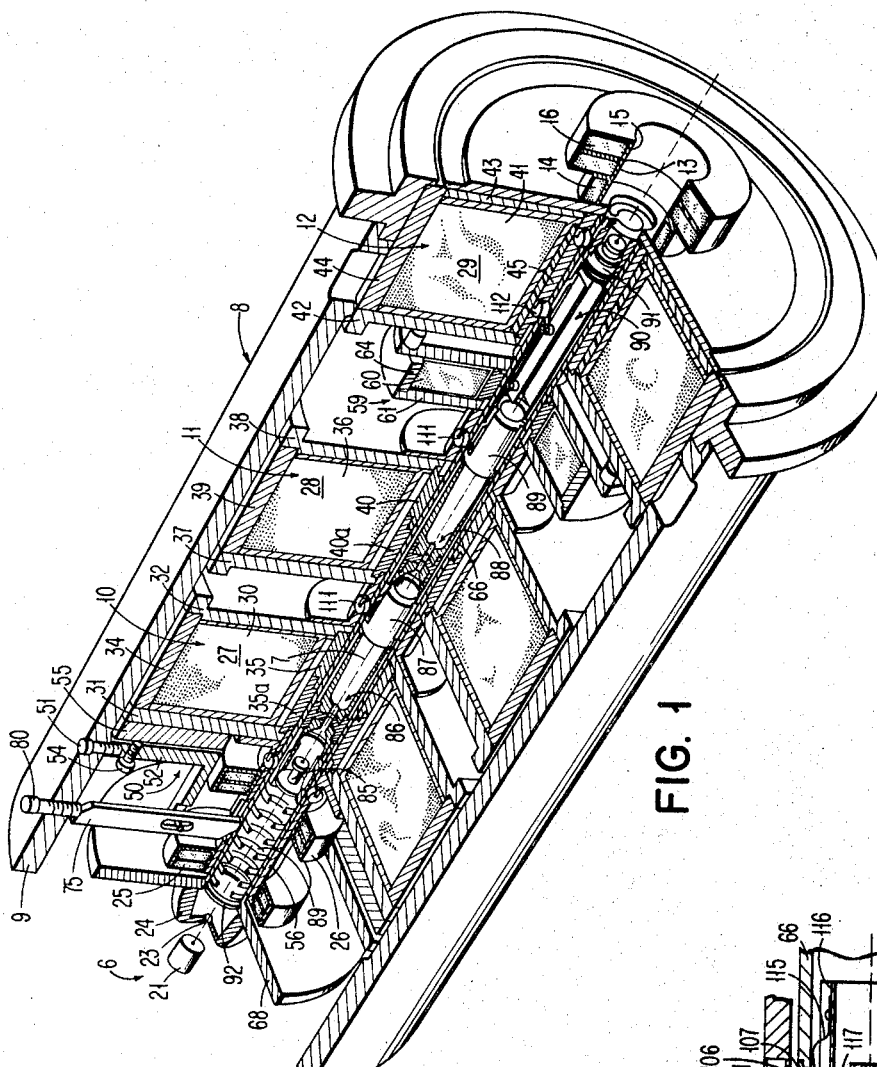

INVENTORS.
KARL H. LOEFFLER
ERIK O. J. SALBU

BY Gerald L. Moore

ATTORNEY

United States Patent Office 3,345,529
Patented Oct. 3, 1967

3,345,529
ELECTRON BEAM COLUMN WITH DEMOUNTABLE FLUX-GENERATING ASSEMBLY AND BEAM-FORMING ELEMENTS
Karl H. Loeffler, San Jose, and Erik O. J. Salbu, Mount View, Calif., assignors to International Business Machines Corporation, Armonk, N.Y., a corporation of New York
Filed Aug. 29, 1966, Ser. No. 575,731
10 Claims. (Cl. 313—84)

This invention relates primarily to an electron beam column of the type suitable for generating an electron beam which can be scanned across a memory element for the purpose of recording data on the element.

In devices to generate electron beams for recording an image, it is important for obtaining a good image that precise control be exercised over the beam in aligning it with a pre-selected axis and in focusing it to the desired spot size onto the memory element. Thus, the image is formed in a column for focusing the electron beam in an accurate manner with one or more lenses. The atmosphere of the column is maintained at a low vacuum pressure for proper operation. Additionally, foreign matter is prevented from gaining access to the column interior.

Any foreign matter gaining access to the column collects on the column interior surfaces including those adjacent to the beam and can adversely affect the operation of the device. The surfaces adjacent the beam, and especially those of the aperture forming members, are struck repeatedly by portions of the electron beam and any contaminates present can become charged. The charged matter thereafter serves to generate randomly located electrostatic fields which tend to deflect portions of the electron beam in an erratic manner. Naturally, it is highly desirable for precise control of the beam, to prevent foreign matter from entering the vacuum cavity of the column. It is equally important to be able either to remove or neutralize the effects of such foreign matter in the column interior in the event it gains admission to the cavity.

The primary object of this invention is to permit easy replacement and cleaning of those elements of an electron beam column which are exposed to the electron beam and thus, are susceptible to becoming contaminated thereafter to affect erratically the operation of the beam.

Another object of this invention is to support the beam-forming elements of an electron beam column in a closely aligned manner and such that they may be removed and replaced easily without requiring extensive realignment procedures when being replaced.

Still another object of this invention is to permit easy removale and replacement of those beam-forming elements requiring electrical connections with other parts of the column for supplying electric current to the element during the beam-forming operation of the column.

In accordance with the present invention, an electron beam column is provided in which the beam-forming elements are releasably clamped in close alignment within a non-magnetic tube, which is itself removably supported in the column flux generating assemblies. By this arrangement, the tube can be removed and replaced easily in the field by unskilled operators without need for elaborate alignment procedures for aligning the beam-forming elements with the flux generating assemblies since the tube automatically aligns the elements. The beam-forming elements thereafter can be removed from the tube for proper cleaning or replacement and re-used at a later date. In addition, separable electrical conductors are supported by the tubes and the elements, which conductors automatically establish electrical circuits for transmitting electric current to those beam-forming elements requiring such energization.

Figure 2:
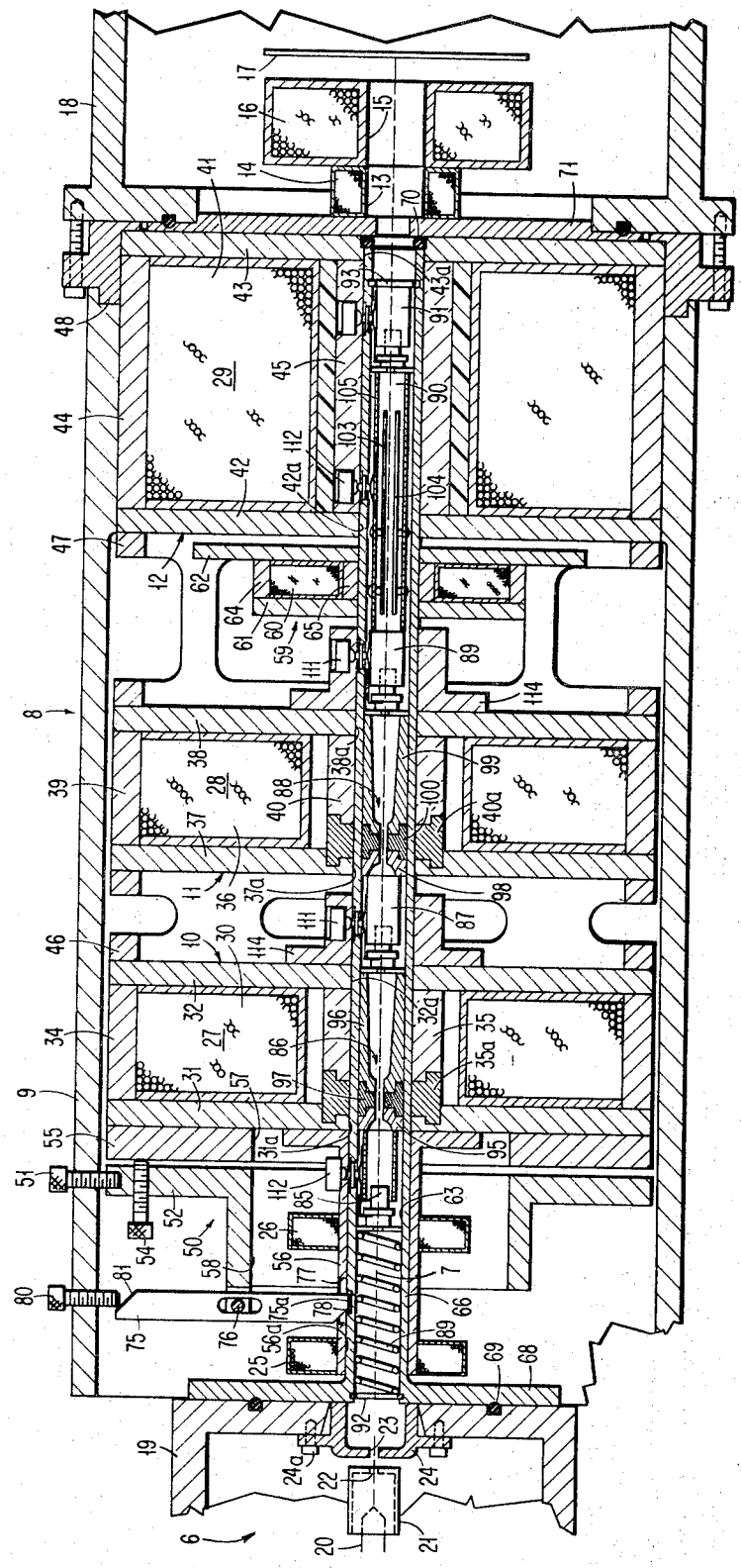

Other advantages of the invention will be apparent from the foregoing description of the preferred embodiment of the invention as illustrated in the accompanying drawings, in which:

FIGURE 1 being a perspective view of an electron beam column incorporating the invention;

FIGURE 2 being a cross-sectional view of an electron beam column of FIGURE 1; and FIGURE 3 being an enlarged cross-sectional view of one of the column elements and the electrical contacts for transmitting electric current to the element.

In the following description, the electron beam column assembly described is adapted for use in a data-recording system. It will be apparent from the description that the same invention features could be adapted for use in other devices utilizing an electron beam, with equally beneficial results.

In the embodiment described, the electron beam is generated in a cathode assembly 6 (see FIGURE 1) and is directed along an axis 7 through an electron beam column 8 assembled within a housing 9. As the beam leaves the cathode assembly 6, it is converged by three lenses 10, 11 and 12 and is passed through a center opening 13 in a toroidally-shaped dynamic focusing coil 14 and an opening 15 in a toroidally-shaped deflecting coil 16. The coils 14 and 16 respectively focus the beam and scan the beam across a memory element 17 (FIGURE 2) supported in a housing 18 forming an extension of the column housing 9. The memory element is made of a material such as an electron-sensitive or thermoplastic film on which a change can be induced at the point of impact of the beam. Thus, by modulating and selectively scanning the beam, information can be recorded on the memory element.

The cathode assembly 6 includes a housing 19 which encloses a heated filament cathode 20 in a grid 21 having a hole 22 in the end thereof through which the electrons can pass. This cathode assembly is removably attached to the column housing 9 in a suitable manner (not shown). After leaving the cathode assembly, the electron beam is passed into the column 8 through an opening 23 in the wall of a housing 24 fixed to the housing 19 by bolts 24a. The opening 23 aligns with the common axis 7. The electron beam thereafter is directed through the column 8 which serves to align the beam with the axis 7 and focuses the beam onto the memory element, preferably to a spot diameter of a few microns in size. To align the electron beam with the axis 7, a pair of toroidally-shaped alignment coils 25 and 26 are positioned along the column axis. By proper energization of the coils with electric current (supplied through conductors not shown), electromagnetic fields are generated which deflect the beam back towards the axis 7 and then turn the beam to a path coinciding with the column axis.

The beam is focused with magnetic flux fields generated in each lens 10, 11 and 12 by a series of three coil assemblies 27, 28 and 29, respectively. These coil assemblies are spaced along the axis 7 within the column housing 9 to generate electromagnetic fields extending to the closely adjacent column axis. The coil assembly 27 comprises a toroidally-shaped coil 30 sandwiched between two disc-like magnetic pole pieces 31 and 32 spaced along the axis 7 and joined by members 34 and 35. The coil assembly 28 similarly comprises a toroidally-shaped coil 36 held between pole pieces 37 and 38 joined by members 39 and 40. In the same manner, the coil assembly 29 comprises a toroidally-shaped coil 41 held between pole pieces 42 and 43 joined by members 44 and 45 extending along the beam axis.

The members 35 and 40 are made of a magnetic material to transmit the flux generated by the coils 27 and 28 and include, respectively, the non-magnetic inserts 35a and 40a forming a flux gap across which the flux field for forming the electron beam extends by way of the pole piece extensions 86 and 88. The member 45 is made of non-magnetic material thereby forming the flux gap of lens 12. Each of the toroidal coils of these lenses are energized by electric current to create the magnetic flux which is transmitted through the pole pieces positioned to each side of the associated coil and towards the axis 7 to establish separate flux fields in each lens closely adjacent to and extending along the column axis. These flux fields serve to converge the electron beam towards a focusing point.

The assemblies 27, 28 and 29 are held within the housing 9 in spaced relationship along the beam axis with spacers 46 and 47 positioned between the adjacent assemblies. To clamp the coil assemblies in place, an end flange 48 is fixed to one end of the housing 9 and a clamping ring 50 is supported in the other end thereof. The generally toroidally-shaped clamping ring 50 is removably held within the column by a plurality of radially extending screws 51 which are threaded through openings in the column housing and into wells in a radially extending flange 52 of the clamping ring. With the ring 50 fixed in place by the screws 51, screws 54 threaded in an axial direction through the clamping ring can be tightened against a plate 55 which abuts the adjacent coil assembly 27. The axial pressure exerted by the screws 54 forces the plate 55 against the pole piece 31 thereby squeezing the coil assemblies 27, 28 and 29 and the included spacers 46 and 47 together within the column.

The alignment coils 25 and 26 previously described are held on a sleeve 56 fixed to the pole piece 31. This sleeve extends axially from the pole piece 31 towards the cathode assembly 6 and through center openings 57 and 58 in the plate 55 and the clamping ring 50, respectively. Additionally, a vernier focusing coil assembly 59 is mounted on the spacer 47, which assembly includes a coil 60 for establishing a magnetic field separate from the field of the coil assembly 29. These coil assemblies 29 and 59 cooperate to adjust the image distance of lens 12 for focusing the beam at the plane of the memory element 17. The toroidally-shaped coil 60 is sandwiched between the pole pieces 61 and 62 which are held apart by spacers 64 and 65. The spacer 65 is made of non-magnetic material.

As pointed out before, the overall purpose of the column is to align the beam along the pre-determined axis 7 and focus the beam to a small spot size in the plane of the memory element. The coil assemblies 27, 28 and 29 function to generate flux fields which serve to focus the beam in succession to a small size so that a sufficiently small image is projected onto the memory element. Proper operation of the electron beam column depends upon maintaining low vacuum conditions throughout the beam path while minimizing, to the extent possible, the effect of any foreign matter which might contaminate the beam-forming elements. However, certain amounts of contaminates usually gain entrance into the column in spite of the precautions taken. For instance, molecules of oil may enter the column continuously from the vacuum pump and the vacuum seals. These oil molecules and other organic materials tend to build up on the beam-exposed surfaces because of the beam-induced polymerization occurring when the beam strikes the molecules thereon. Thus, it is important not only to limit the entrance of contaminates into the column, but also to provide means for periodic repair, cleaning and replacement of the beam-exposed parts.

In accordance with the present invention, the electron beam is regulated and controlled in a hollow tube or pipe forming a vacuum chamber enclosing the beam, which tube is removably held in the coil assemblies and, in turn, removably supports all beam-forming elements in exact alignment along the column axis. Thus, maintenance of the electron beam column is simplified since the tube can be removed easily from the column and additionally, the beam-exposed elements are easily separable from the tube. With this construction, the flux fields are transmitted by the elements to positions very close to the column axis for precise control of the electron beam. Additionally, vacuum conditions need be maintained only within the tube of the column thereby reducing the overall volume which must be evacuated and maintained in an uncontaminated condition.

Accordingly, a non-magnetic tube or pipe 66 is extended through the column housing 9 having a center opening 67 of uniform circular cross-section extending concentric with the column axis 7. A flange 68 is fixed to the end of the tube adjacent the cathode assembly 10, abuts the outer surface of the cathode housing 19 with a ring seal 69 sandwiched therebetween for sealing purposes. The opposite end of the tube 66 abuts a ring seal 70 pressed against a plate 71 which is fixed to the end pole piece 42 adjacent the memory element 17. A seal 74 is clamped between the plate 71 and the memory element housing 18. Thus, the cathode assembly housing 19, the tube 66 and the memory element housing 18 form a continuous vacuum chamber through which the electron beam is directed. The vacuum of this chamber is established by a suitable pump (not shown).

The tube 66 is mounted within the column by being extended axially through aligned openings in the pole pieces of the coil assemblies 27, 28 and 29 such that it is aligned automatically with the axis 7 of the column. Center openings 31a, 32a, 37a, 38a, 42a and 43a are formed in the pole pieces 31, 32, 37, 38, 42, and 43 respectively, for holding the tube. Additionally, the tube is supported within the center opening 56a of the sleeve 56 on which are mounted the alignment coils 25 and 26. The center openings in the pole pieces and sleeve are aligned closely, are centered about the column axis and are formed to fit closely around the exterior wall of the tube 66 for holding the tube in precisely the same position relative to the axis each time it is inserted into the column.

The tube 66 is clamped within the coil assemblies by one or more links 75 which are pivotally mounted on a pin 76 fixed to the clamping ring 50 and which interlock with said tube. The inner end 75a of this link extends through an opening 77 in the sleeve 56 and into a recess 78 in the wall of the tube 66. By tightening a screw 80, threaded through the column wall 9, against a bevelled edge 81 on the outer end of the link, the link is pivoted counter-clockwise about the pin 76 to cause the inner end 75a to press against the forward edge of the recess 78 for compressing the seal 70 and locking the tube within the column. Loosening of the screw 80 allows the link 75 to be cammed in a clockwise direction for removal of the tube from the column 8.

In the center opening 67 of the tube 66 are stacked the beam-forming elements in side-by-side abutting relationship. These elements include (in the order listed extending from the cathode assembly towards the memory element), an aperture assembly 85, a pole extension assembly 86, an aperture assembly 87, a pole extension assembly 88, an aperture assembly 89, a blanking plate assembly 90 and an aperture assembly 91. The elements named are stacked between spring clips 92 and 94 releasably seated in grooves at each end of the inner wall of the tube 66. Means may be provided to insure proper relative angular position between the individual internal elements, the column and the flux generating assembly such as cooperating grooves and projections on adjacent surfaces. A compression spring 84 sandwiched between the spring clip 92 and the aperture assembly 85 holds the beam-forming elements tightly together and in axial alignment with the coil assemblies external to the tube when the tube is clamped in the column.

The pole extension assembly 86 comprises magnetic pole members 95 and 96 separated by a non-magnetic insert 97 forming the flux gap of the lens. Similarly the pole extension assembly 88 includes pole members 98 and 99 separated by a non-magnetic insert 100. Thus, each pair of these pole members functions to transmit the flux field to a position immediately adjacent to the column axis 7 to establish a flux field for precise focusing of the electron beam.

The aperture assemblies 85, 87, 89 and 91 serve to limit the size of the electron beam by intercepting those electrons at the outer fringes of the beam cross-section. Each aperture assembly includes an aperture plate 101 (FIGURE 2) forming an aperture 102 coinciding with the column axis for passage of the beam. The aperture in each assembly is sized to limit properly the maximum cross-sectional diameter of the beam at the position of the particular aperture plate.

Between the aperture assemblies 89 and 91 is positioned the blanking plate assembly 90 which, when energized, serves to divert the beam sufficiently to prevent it from striking the memory element. The blanking plate assembly includes planar electrostatic plates 103 and 104 mounted on a body member 105 and positioned in parallel relationship to each side of the column axis. By proper energization of these plates an electrostatic field is established which diverts the beam sufficiently to cause it to miss the aperture opening formed by the aperture assembly 91. The beam can be modulated for recording data on the memory element by controlling the energization of the plates.

In operation, the electrons emitted from the heated cathode 20 pass through the openings 22 and 23 and into the interior of the beam column 8. The beam is aligned with the column axis 7 by proper energization of the alignment coils 25 and 26 thereafter to pass through the aperture of the assembly 85. The beam then is focused by the lenses 10 and 11 for passage through the adjacent aperture assemblies. After passing between the blanking plates 103 and 104, the beam is focused by the lens 12 and passes through the dynamic focusing coil 14 and the deflecting coil 16 to strike the memory element 17.

All the beam-exposed elements are positioned within the tube 66 and the flux generated by the coil assemblies 27 and 28 passes through the tube walls and into the pole extension assemblies to focus the beam. Since the tube 66 is formed of a relatively thin, non-magnetic material, it represents only a small reluctance value in the flux circuits extending between the coil assemblies and the pole extension assemblies. Furthermore, the pole extension members always are held in close alignment and in a position immediately adjacent to the coil assemblies for receiving the flux to properly focus the beam.

Since the formation of contaminate layers on the beam-exposed surfaces of the column can rarely be prevented, means have been devised to reduce the effects of the contaminates on the proper operation of the column. It is known that by heating electron beam-exposed parts the depositing of contaminates thereon can be reduced greatly. Additionally, most contaminates on the parts can be rendered electrically conductive to dissipate any electrical charge resulting when the beam strikes the contaminates. Accordingly, the aperture forming plates 101 are heated by transmitting sufficient electric current through a portion of the aperture assembly in heat transfer relationship with the plate, by passing the electric current directly through the plate itself. The aperture assembly portion becomes heated when energized by the current because of the electrical resistance of the material transmitting the electric current. Additionally, electric current is transmitted to charge the blanking plates 103 and 104 for proper operation of the blanking plate assembly 90 in the manner previously described.

In accordance with another feature of the present invention, electrical conductors are supported in the walls of the tube 66, which conductors abut spring-loaded contacts fixed along the outer surface of the tube within the column and spring-loaded contacts on the beam-forming elements, to form a circuit for conducting electric current to the elements. Thus, removal of the tube from the column and removal of the beam-forming elements from the tube may be performed easily with the electrical circuits being established automatically as the components are re-assembled. Accordingly, a plurality of conductors 106 are mounted within insulating sleeves 107 fixed within openings 109 in the wall of the tube 66. Electric current is conducted to each of the conductors 106 through a series of spring contacts 110 fixed individually to one of the supports 111 or 112 held alongside the tube and within the column 8. The two supports 111 are fixed to sleeves 114 attached to the pole pieces 32 and 38, respectively. The supports 112 are fastened to the sleeve 56 and the spacer 45, respectively.

Inside the tube 66, spring contacts 115 are fixed to sleeves 116 of each aperture assembly and to the body member 105 of the blanking plate. Electric current from the spring contact 115 is transmitted to heating means or coils 117 of the aperture assembly offering resistance to, and thereby becoming heated by, the electric current for heating the aperture plate. In the same manner, electric current is transmitted through the spring contact 115 positioned adjacent the blanking plate assembly to the blanking plates 103 and 104 by electrical conductors (not shown) connecting these components.

In the manner described, the beam-forming elements can be removed quickly and can be reinserted easily into the opening 67 in the tube 66 to align automatically with the adjacent conductors 106 and receive current through the tube wall for proper operation. A wiping contact is established between each of the spring contacts 110 and 115 and the associated conductor 114 to maintain a good electrical circuit for transmitting the electric current to the beam-forming elements. Thus, by the invention described, there is provided an electron beam column allowing easy removal and replacement of the beam-forming elements and of the tube holding the elements wherein the elements are supplied electric current for proper operation.

While the invention has been particularly shown and described with reference to a preferred embodiment thereof, it will be understood by those skilled in the art that various changes in form and details may be made therein without departing from the spirit and scope of the invention.

We claim as our invention:

1. An electron beam column comprising:
    a source to produce a beam of electrons for transmission along a pre-selected axis,
    a flux generating assembly including a plurality of flux transmitting cores spaced along said axis, said cores having aligned openings for the passage of said beam,
    a non-magnetic tube slideably and removably fitted into said openings and being sized to fit closely adjacent said cores and having a center opening coinciding with said axis when fitted into said core openings,
    a plurality of beam-forming elements formed to slide into said tube in side-by-side relationship to regulate the beam, and
    releasable clamping means for holding said tube and beam-forming elements, in a pre-determined position relative to each other and relative to said flux generating assembly whereby said tube can be removed from said flux generating assembly and said elements can be removed easily from said tube for cleaning and repair.

2. An electron beam column as defined in claim 1 wherein one of said beam-forming elements includes an axially extending magnetic member positioned to receive the flux from said cores and transmit it to a point adjacent said axis to establish a flux field for forming said beam.

3. An electron beam column as defined in claim 1 wherein an electric coil is included between each pair of adjacent cores which coil, when energized, generates a flux field, and
   one of said beam-forming elements includes a flux transmitting member positioned in said tube center opening adjacent each core of a pair, with the members being magnetically isolated from each other thereby to form a magnetic lens for focusing the beam.

4. An electron beam column as defined in claim 1 including a spring positioned to exert a force on said elements positioned within said tube center opening in a direction longitudinal of said tube for holding said elements immovable therein.

5. An electron beam column as defined in claim 3 including a second beam-forming element supported on the opposite side of said flux transmitting member from said source and having a plate member forming an aperture coincidental with the axis, said second beam-forming element including means for heating said plate member to prevent contamination thereof.

6. An electron beam column as defined in claim 1 including an insulated electrical conductor extending through said tube wall, and contact means on one of said elements in said tube positioned to abut said conductor when the one element is placed in the tube for transmitting electric current to said one element.

7. An electron beam column as defined in claim 6 including contact means on said flux generating assembly positioned to abut said electrical conductor when the tube is placed in said flux generating assembly to conduct electric current to said one element.

8. An electron beam column as defined in claim 7 wherein the contact means on said one element and said flux generating assembly are spring loaded to form a good electrical connection when abutting said insulated conductor.

9. An electron beam column as defined in claim 1 including energizable means to heat one of said beam-forming elements,
   an insulated electrical conductor mounted in a radially extending opening in said tube with an electrical contact on said flux generating assembly outside said tube for transmitting electric current to said conductor, and
   a contact on a beam-forming element within said tube abutting said conductor when the one element is in place in said tube opening for transmitting electric current from outside said tube to energize said energizable means and thereby heat said beam-forming element.

10. An electron beam column as defined in claim 5 wherein said releasable clamping means includes a link member pivotally mounted on said flux generating assembly in a position to interlock with said tube, and
    screw means for holding the link member interlocked with said tube to clamp said tube in said flux generating assembly.

References Cited
UNITED STATES PATENTS

| | | | |
|---|---|---|---|
| 2,468,403 | 4/1949 | Liebmann | 313—84 X |
| 3,150,256 | 9/1964 | Wilska | 250—49.5 |

DAVID J. GALVIN, *Primary Examiner.*

R. SEGAL, *Assistant Examiner.*